United States Patent
Ravichandran et al.

(10) Patent No.: US 12,233,849 B2
(45) Date of Patent: Feb. 25, 2025

(54) SYSTEM AND METHOD FOR CONTROLLING ENGINE STARTING DEVICES

(71) Applicant: Ford Global Technologies, LLC, Dearborn, MI (US)

(72) Inventors: Maruthi Ravichandran, Dearborn, MI (US); Marin Assaliyski, Dearborn, MI (US); Nicholas D. Moore, Dearborn, MI (US); Calvin Trescott, Farmington Hills, MI (US); Naginder Gogna, Northville, MI (US); Rajit Johri, San Francisco, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 391 days.

(21) Appl. No.: 17/662,172

(22) Filed: May 5, 2022

(65) Prior Publication Data
US 2023/0356709 A1    Nov. 9, 2023

(51) Int. Cl.
| | |
|---|---|
| *B60W 20/40* | (2016.01) |
| *B60W 10/02* | (2006.01) |
| *B60W 10/06* | (2006.01) |
| *F02N 11/08* | (2006.01) |

(52) U.S. Cl.
CPC ............ *B60W 20/40* (2013.01); *B60W 10/02* (2013.01); *B60W 10/06* (2013.01); *F02N 11/0851* (2013.01); *B60W 2510/0275* (2013.01); *B60W 2510/1005* (2013.01); *B60W 2540/10* (2013.01); *B60W 2710/021* (2013.01); *B60W 2710/06* (2013.01); *F02N 2200/0802* (2013.01); *F02N 2200/101* (2013.01)

(58) Field of Classification Search
CPC .... B60R 21/0136; G06Q 40/08; G07C 5/008; G07C 5/0808; G07C 5/0841
See application file for complete search history.

(56) References Cited

U.S. PATENT DOCUMENTS

| | | | |
|---|---|---|---|
| 11,247,655 B2 | 2/2022 | Li et al. | |
| 2013/0297105 A1* | 11/2013 | Yamazaki | B60W 10/02 903/902 |
| 2014/0046529 A1* | 2/2014 | Gibson | F02N 11/00 701/22 |
| 2020/0122708 A1* | 4/2020 | Kucharski | B60W 20/40 |
| 2021/0078578 A1 | 3/2021 | Meyer et al. | |

FOREIGN PATENT DOCUMENTS

EP    2772397 A1    9/2014

* cited by examiner

*Primary Examiner* — James J Lee
*Assistant Examiner* — Steven Vu Nguyen
(74) *Attorney, Agent, or Firm* — David Kelley; McCoy Russell LLP (57) ABSTRACT

Systems and methods for selecting which of a plurality of engine starting devices starts an internal combustion engine of a hybrid vehicle are presented. In one example, engine starting devices may be selected and operated while a vehicle is operating in a creep mode. The system and method may place a driveline disconnect clutch in a wait state or engage a flywheel starter to improve engine starting.

17 Claims, 4 Drawing Sheets

SYSTEM AND METHOD FOR CONTROLLING ENGINE STARTING DEVICES

FIELD

The present description relates to methods and a system for selecting engine starting devices and starting an internal combustion engine of a hybrid vehicle.

BACKGROUND AND SUMMARY

A vehicle may operate in a creep mode where one or more vehicle propulsion sources provide a small amount of torque so that a vehicle may move at a slow speed when a brake pedal of the vehicle is released and when a driver demand pedal is not applied. The creep mode may prevent the vehicle from rolling backward when the vehicle is stopped on an incline and the brake pedal is released. If the hybrid vehicle is operating in electric only mode and an engine start is requested while the vehicle is stationary or in creep mode, it may be difficult to produce consistent engine starts if the engine is started every time via closing a driveline disconnect clutch. Therefore, it may be desirable to provide a method for starting an engine of a vehicle while the vehicle is stationary or operating in creep mode so that engine starting consistency may be improved while providing a desired level of vehicle responsiveness.

The inventors herein have recognized the above-mentioned issues and have developed a method for operating a vehicle, comprising: via a controller, scheduling an internal combustion engine of the vehicle to be started via closing a driveline disconnect clutch; and via the controller, increasing a line pressure and delaying starting of the internal combustion engine via closing the driveline disconnect clutch while the line pressure is less than a threshold pressure, a driver demand pedal is not applied, and a gear selector is in a gear engagement position.

By waiting to engage a driveline disconnect clutch in response to a gear selector position, line pressure, and driver demand pedal position, it may be possible to provide the technical result of repeatable engine starts while meeting vehicle responsiveness objectives. In particular, line pressure of a passage or conduit that supplies fluid to a driveline disconnect clutch may be increased and the driveline disconnect clutch may be closed after the line pressure meets a threshold pressure so that the driveline disconnect clutch closes in a repeatable way. However, if a driver demand pedal is applied while the vehicle is engaged in drive before pressure builds within the supply line, the engine may be started by a flywheel starter. Thus, both engine starting devices may be leveraged under different operating conditions to improve engine starting.

The present description may provide several advantages. In particular, the approach may improve hybrid driveline operation during creep mode when an engine start request is asserted. Further, the approach may reduce driveline torque disturbances. Additionally, the approach may improve a vehicle's response and drivability.

The above advantages and other advantages, and features of the present description will be readily apparent from the following Detailed Description when taken alone or in connection with the accompanying drawings.

It may be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
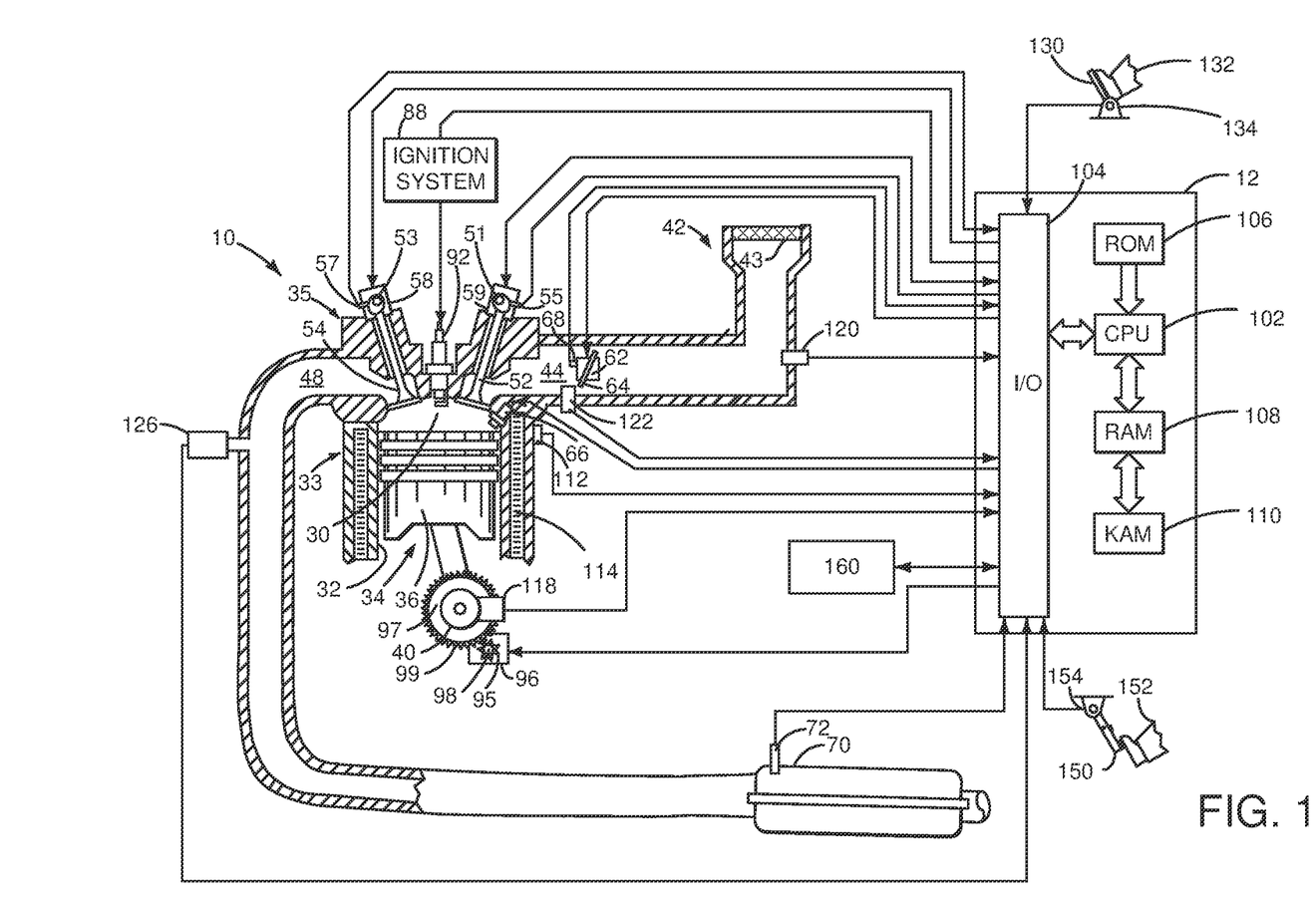
FIG. 1 is a schematic diagram of an engine.
Figure 2:
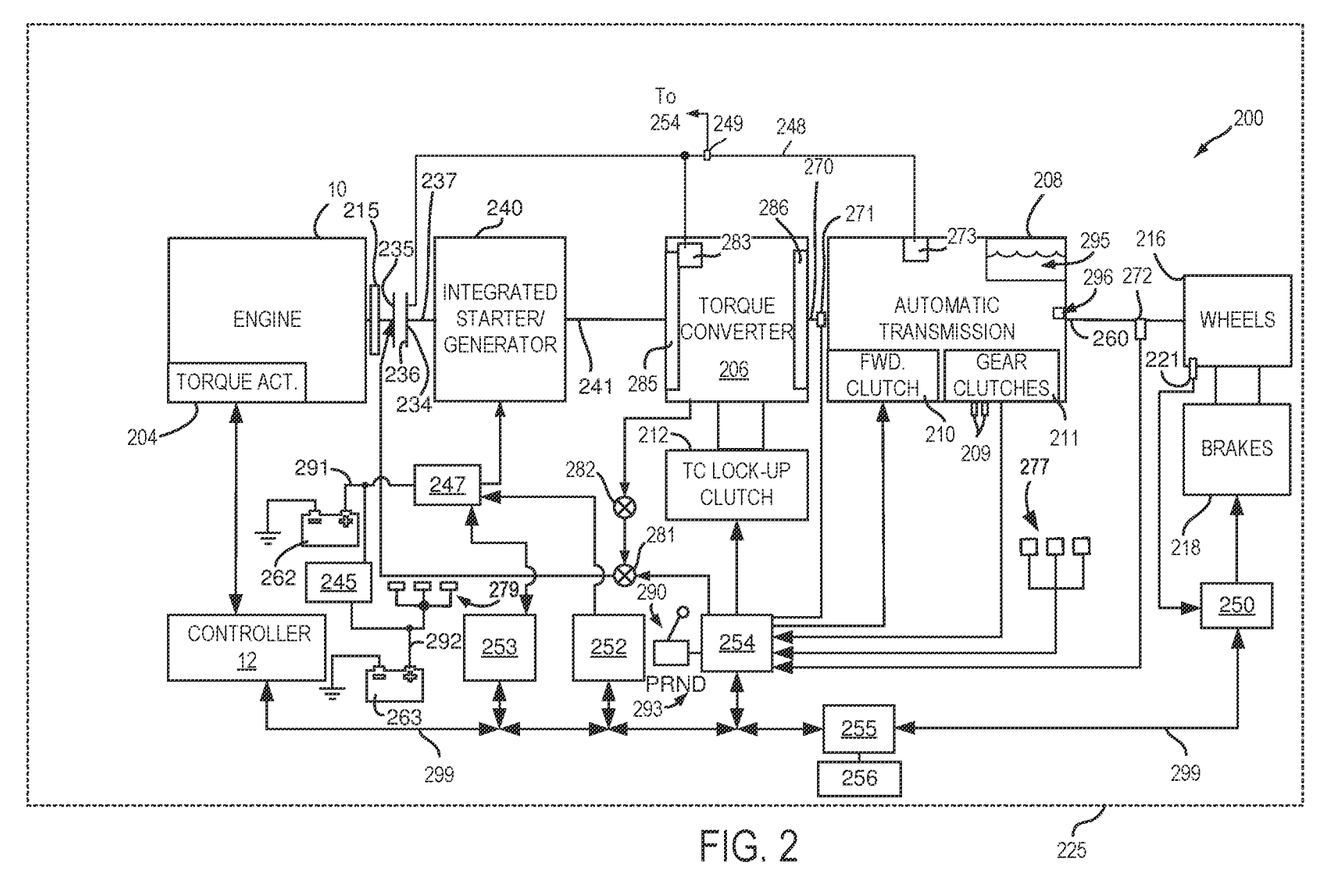
FIG. 2 is a schematic diagram of a hybrid vehicle driveline including the engine of FIG. 1.
Figure 3:
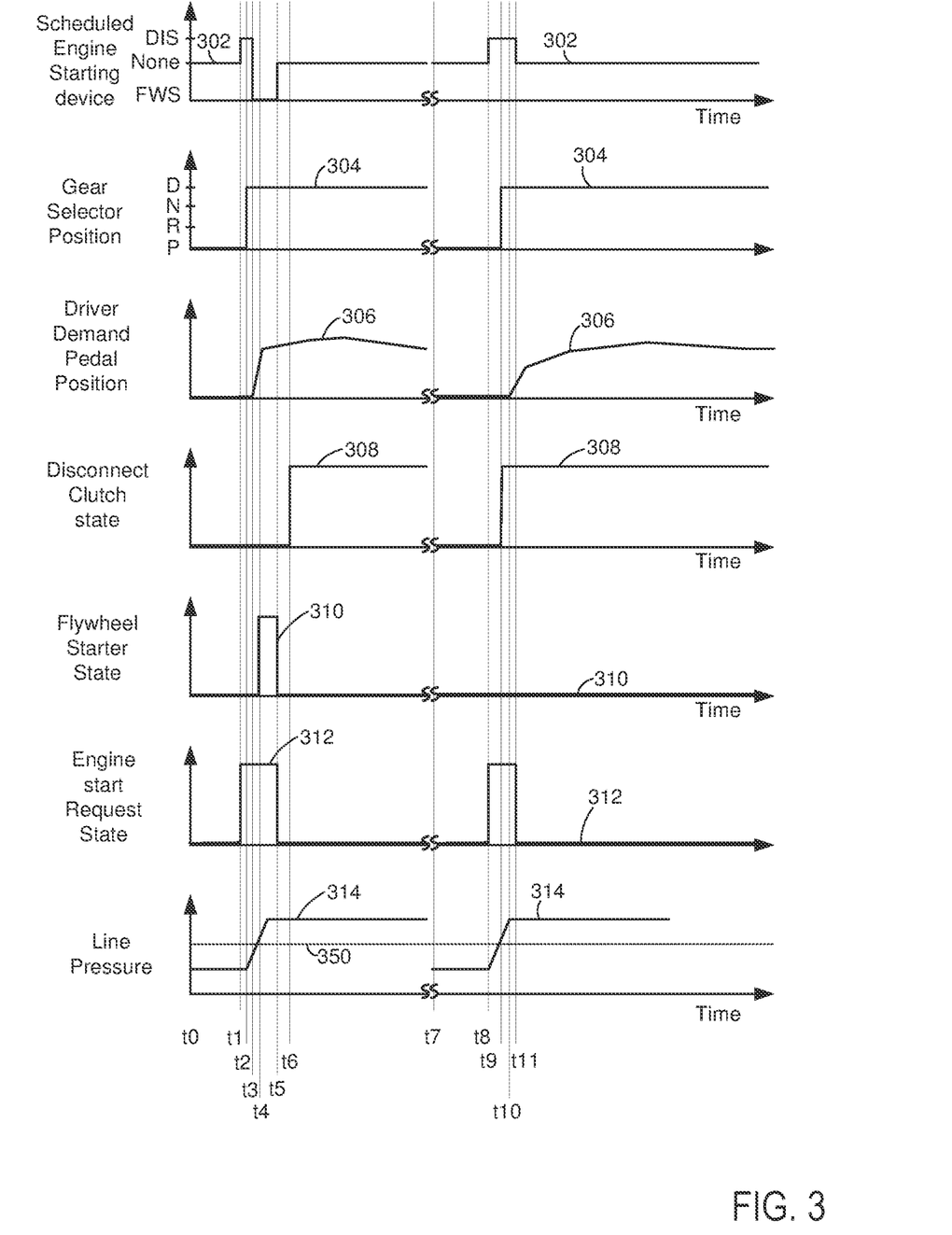
FIG. 3 shows example engine starting sequences according to the method of FIG. 4.
Figure 4:
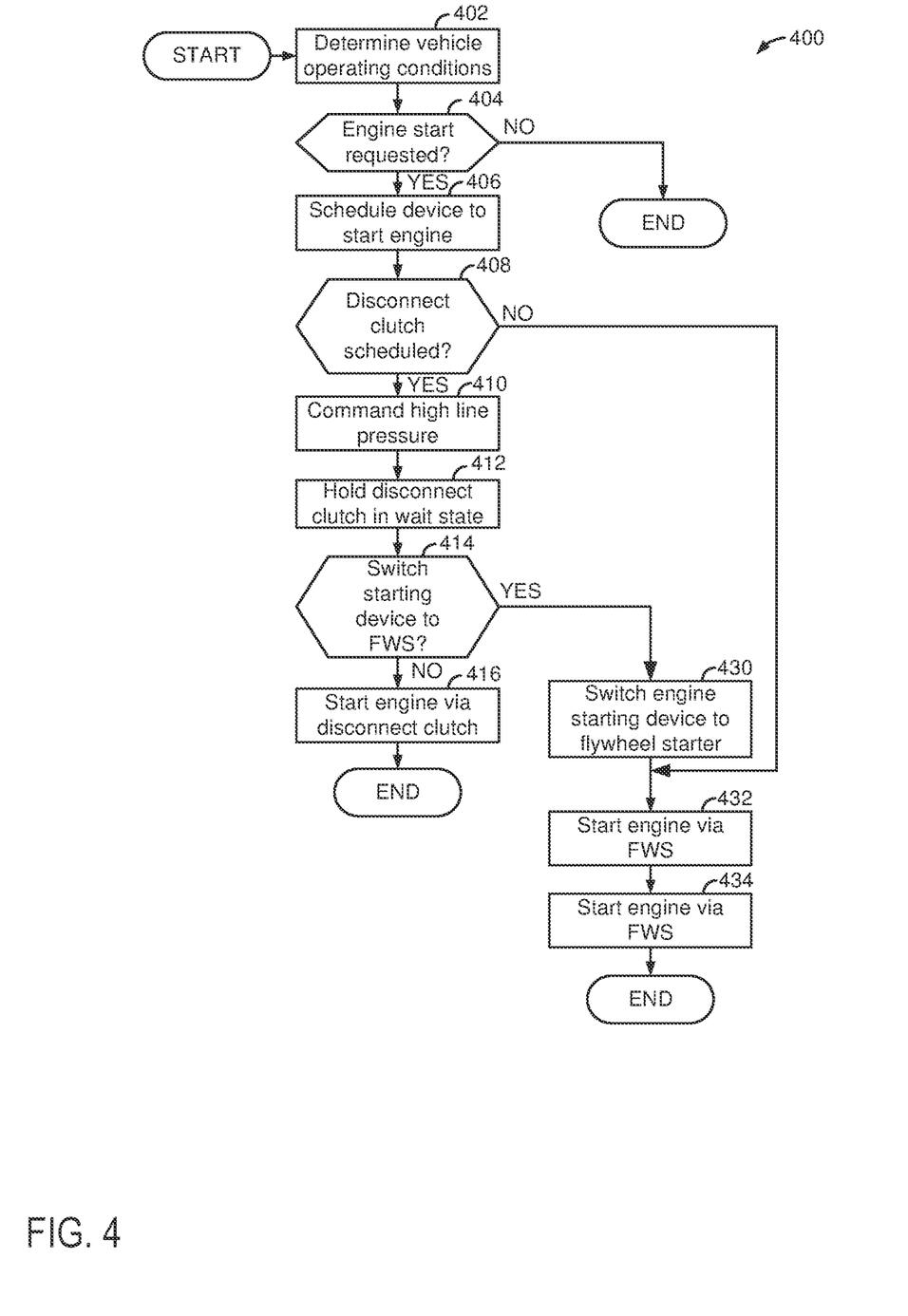
FIG. 4 shows a method for starting an engine of a hybrid vehicle.

The present description is related to improving engine starting of a hybrid vehicle. Specifically, a driveline disconnect clutch may be placed in a wait state where the driveline disconnect clutch is permitted to provide less than a threshold torque transfer capacity so that pressure in a line that supplies fluid to the driveline disconnect clutch is allowed to build. Once line pressure exceeds a threshold pressure, the driveline disconnect clutch may be commanded closed. The higher line pressure may permit the driveline disconnect clutch to close consistently so that the engine may engage with the driveline in a smooth way. However, if the driveline disconnect clutch is in a wait state and driver demand increases, the engine may be started via a flywheel starter so that the engine may be started without pulling driveline speed down via closing the driveline disconnect clutch in a way that may cause a driveline torque disturbance. The engine may be of the type that is shown in FIG. 1. The engine may be part of a hybrid powertrain or driveline as shown in FIG. 2. An operating sequence according to the methods of FIG. 4 is shown in FIG. 3. FIG. 4 shows a flowchart of methods for controlling engine starting when a vehicle is operating in creep mode.

Referring to FIG. 1, internal combustion engine 10, comprising a plurality of cylinders, one cylinder of which is shown in FIG. 1, is controlled by electronic controller 12 (e.g., an engine controller). Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Flywheel starter 96 (e.g., low voltage (operated with less than 30 volts) electric machine) includes pinion shaft 98 and pinion gear 95. Pinion shaft 98 may selectively advance pinion gear 95 to engage ring gear 99. Flywheel starter 96 may be directly mounted to the front of the engine or the rear of the engine. In some examples, flywheel starter 96 may selectively supply torque to crankshaft 40 via a belt or chain. In one example, flywheel starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be hydraulic and/or electromechanical devices.

Fuel injector 66 is shown positioned to inject fuel directly into cylinder 34, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow from engine air intake 42 to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Catalytic converter 70 can include multiple catalyst bricks, in one example. In another example, multiple emission control devices, each with multiple bricks, can be used. Catalytic converter 70 can be a three-way type catalyst in one example. Temperature of catalytic converter 70 (e.g., catalyst) may be monitored via temperature sensor 72.

Controller 12 may receive input data from and provide output data to human/machine interface 160. Human/machine interface 160 may be a touch screen display, key board, or other known interface. Controller 12 may provide and display system status information via human/machine interface 160. A human user may input requests for powertrain and passenger cabin climate controls to human/machine interface 160.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an driver demand pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a position sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Driveline 200 is shown including vehicle system controller 255, controller 12, electric machine controller 252, transmission controller 254, energy storage device controller 253, and brake controller 250. The controllers may communicate over controller area network (CAN) 299. In addition, vehicle system controller 255 may communicate with communications system 256 (e.g., a transceiver) so that vehicle 225 may communicate with a remote server (not shown) via cellular network, satellites, vehicle to vehicle communications network, or other radio frequency communications system. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to controller 12, electric machine controller 252, transmission controller 254, and brake controller 250 to achieve driver input requests and other requests that are based on vehicle operating conditions.

For example, in response to a driver (human or autonomous) releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, controller 12, electric machine controller 252, transmission controller 254, and brake controller 250. Alternatively, the vehicle system controller 255 and the controller 12 may be a single unit while the electric machine controller 252, the transmission controller 254, and the brake controller 250 are standalone controllers.

In this example, driveline 200 may be powered by engine 10 and electric machine 240. In other examples, engine 10 may be omitted. Engine 10 may be started with an engine starting system shown in FIG. 1 or via electric machine 240 also known as an integrated starter/generator (ISG). Further, power of engine 10 may be adjusted via power actuator 204, such as a fuel injector, throttle, etc.

Driveline 200 is shown to include an electric energy storage device 262. Electric energy storage device 262 may output a higher voltage (e.g., 48 volts) than electric energy storage device 263 (e.g., 12 volts). DC/DC converter 245 may allow exchange of electrical energy between high voltage bus 291 and low voltage bus 292. High voltage bus 291 is electrically coupled to higher voltage electric energy storage device 262. Low voltage bus 292 is electrically coupled to lower voltage electric energy storage device 263 and sensors/actuators/accessories 279. Sensors/actuators/accessories 279 may include but are not limited to front and rear windshield resistive heaters, vacuum pumps, climate control fans, and lights. Inverter 247 converts DC power to AC power and vice-versa to enable power to be transferred between electric machine 240 and electric energy storage device 262.

An engine output power may be transmitted to an input or first side of driveline disconnect clutch 235 through dual mass flywheel 215. Driveline disconnect clutch 236 may be hydraulically actuated via fluid (e.g., oil) that is pressurized via pump 283. A position of valve 282 (e.g., line pressure control valve) may be modulated to control a pressure (e.g., a line pressure) of fluid that may be supplied to driveline disconnect clutch pressure control valve 281. A position of valve 281 may be modulated to control a pressure of fluid that is supplied to driveline disconnect clutch 235. The downstream or second side 234 of driveline disconnect clutch 236 is shown mechanically coupled to electric machine input shaft 237.

Electric machine 240 may be operated to provide power to driveline 200 or to convert powertrain power into electrical energy to be stored in electric energy storage device 262 in a regeneration mode. Electric machine 240 is in electrical communication with electric energy storage device 262. Electric machine 240 has a higher output power capacity than flywheel starter 96 shown in FIG. 1. Further, electric machine 240 directly drives driveline 200 or is directly driven by driveline 200. There are no belts, gears, or chains to couple electric machine 240 to driveline 200. Rather, electric machine 240 rotates at the same rate as driveline 200. Electric energy storage device 262 (e.g., high voltage battery or power source, which may be referred to as a traction battery) may be a battery, capacitor, or inductor. The downstream side of electric machine 240 is mechanically coupled to the torque converter impeller 285 of torque converter 206 via shaft 241. The upstream side of the electric machine 240 is mechanically coupled to the disconnect clutch 236. Electric machine 240 may provide a positive power or a negative power to driveline 200 via operating as a motor or generator as instructed by electric machine controller 252.

Torque converter 206 includes a torque converter turbine 286 to output power to input shaft 270. Input shaft 270 mechanically couples torque converter 206 to automatic transmission 208. Torque converter 206 also includes a torque converter lock-up clutch 212 (TCC). Power is directly transferred from torque converter impeller 285 to torque converter turbine 286 when the torque converter lock-up clutch is locked. The torque converter lock-up clutch is electrically operated by controller 254. Alternatively, the torque converter lock-up clutch may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of automatic transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter lock-up clutch 212 by adjusting the torque converter lock-up clutch in response to various engine operating conditions, or based on a driver-based engine operation request.

Torque converter 206 also includes pump 283 that pressurizes transmission fluid 295 to operate driveline disconnect clutch 236, forward clutch 210, and gear clutches 211. Pump 283 is driven via torque converter impeller 285, which rotates at a same speed as electric machine 240. In some examples, an electric pump 273 may also be provided to pressurize transmission fluid 295. Line or conduit 248 may receive transmission fluid 295 from electric pump 273 and/or pump 283. The transmission fluid may be delivered to the driveline disconnect clutch 236. Pressure in conduit 248 may be sensed via pressure sensor 249.

Automatic transmission 208 includes gear clutches 211 (e.g., gears 1-10) and forward clutch 210 that may be actuated via transmission fluid 295. Automatic transmission 208 is a fixed ratio transmission. Alternatively, automatic transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Parking pawl 296 may be engaged to prevent motion of output shaft 260 when automatic transmission 208 is in park. Transmission controller 254 selectively activates or engages torque converter lock-up clutch 212, gear clutches 211, and forward clutch 210. Transmission controller also selectively deactivates or disengages torque converter lock-up clutch 212, gear clutches 211, and forward clutch 210.

A frictional force may be applied to wheels 216 by engaging friction brakes 218. In one example, friction brakes 218 for wheels 216 may be engaged in response to a human driver pressing their foot on a brake pedal (not shown) and/or in response to instructions within brake controller 250. Further, brake controller 250 may apply friction brakes 218 in response to information and/or requests made by vehicle system controller 255. In the same way, a frictional force may be reduced to wheels 216 by disengaging friction brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the electric machine. Vehicle system controller 255 requests the engine power from controller 12 and the electric machine power from electric machine controller 252. If the electric machine power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter lock-up clutch 212 and engages gears via gear clutches 211 in response to shift schedules and torque converter lock-up clutch lockup schedules that may be based on input shaft power and vehicle speed. In some conditions when it may be desired to charge electric energy storage device 262, a charging power (e.g., a negative electric machine power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the electric machine 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears based on a unique shifting schedule to increase regeneration efficiency. Engine 10 and electric machine 240 may supply a negative power to transmission input shaft 270, but negative power provided by electric machine 240 and engine 10 may be limited by transmission controller 254 which outputs a transmission input shaft negative power limit (e.g., not to be exceeded threshold value). Further, negative power of electric machine 240 may be limited (e.g., constrained to less than a threshold negative threshold power) based on operating conditions of electric energy storage device 262, by vehicle system controller 255, or electric machine controller 252. Any portion of desired negative wheel power that may not be provided by electric machine 240 because of transmission or electric machine limits may be allocated to engine 10 and/or friction brakes 218 so that the desired wheel power is provided by a combination of negative power (e.g., power absorbed) via friction brakes 218, engine 10, and electric machine 240.

Accordingly, power control of the various powertrain components may be supervised by vehicle system controller 255 with local power control for the engine 10, automatic transmission 208, electric machine 240, and friction brakes 218 provided via controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from electric machine 240 by adjusting current flowing to and from rotor and/or armature windings of electric machine as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, controller 12, and vehicle system controller 255, may also receive addition transmission information from sensors 277, which may include but are not limited to pump output line pressure sensors, transmission hydraulic pressure sensors (e.g., gear clutch fluid pressure sensors), a transmission fluid temperature sensor, electric machine temperature sensors, gear selector position sensors, and an ambient temperature sensor. Transmission controller 254 may also receive requested gear input from gear selector 290 (e.g., a human/machine interface device). Gear selector 290 may include positions for gears 1-N(where N is an upper gear number), D (drive), R (reverse), and P (park) as indicated at 293.

Brake controller 250 receives wheel speed information via wheel speed sensor 221 and braking requests from vehicle system controller 255. Brake controller 250 may also receive brake pedal position information from position sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative electric machine power does not cause the wheel power limit to be exceeded. For example, if controller 250 issues a negative wheel power limit of 50 N-m, electric machine power is adjusted to provide less than 50 N-m (e.g., 49 N-m) of negative power at the wheels, including accounting for transmission gearing.

Thus, the system of FIGS. 1 and 2 provides for a system, comprising: an internal combustion engine; an integrated starter/generator; a disconnect clutch positioned in a driveline between the internal combustion engine and the integrated starter/generator; a transmission included in the driveline; and a controller including executable instructions stored in non-transitory memory that cause the controller to place operation of the disconnect clutch in a wait state, where a torque capacity of the disconnect clutch is constrained below a threshold value, while a line pressure is less than a threshold pressure and an engine start is requested. In a first example, the system further comprises additional instructions to start the internal combustion engine via closing the disconnect clutch in response to the line pressure exceeding the threshold pressure. In a second example that may include the first example, the system further comprises a flywheel starter coupled to the internal combustion engine. In a third example that may include one or both of the first and second examples, the system further comprises additional instructions to start the internal combustion engine via the flywheel starter in response to driver demand pedal position increasing. In a fourth example that may include one or more of the first through third examples, the system further comprises additional instructions to start the internal combustion engine and not place the disconnect clutch in the wait state in response to an engine start request, a driver demand pedal being applied, and a gear selector being in a gear position. In a fifth example that may include one or more of the first through fourth examples, the system includes where the gear position is reverse or drive. In a sixth example that may include one or more of the first through fifth examples, the system further comprises additional instructions to start the internal combustion engine via closing the disconnect clutch in response to a threshold amount of time passing since a most recent engine start request.

Referring now to FIG. 3, a prophetic driveline operating sequence is shown. The operating sequence of FIG. 3 may be provided via the system of FIGS. 1 and 2 in cooperation with the methods of FIG. 4. The vertical lines at times t0-t11 represent times of interest during the operating sequence. The plots are time aligned and the double SS marks along the horizontal axes indicate a break in the sequence.

The first plot from the top of FIG. 3 is a plot of a scheduled engine starting device (e.g., an engine starting device that is planned or expected to start the internal combustion engine) versus time. The vertical axis represents the scheduled engine starting device and the scheduled engine starting device may be the driveline disconnect clutch (DIS), none, or the flywheel starter (FWS). The horizontal axis represents time and time increases from the left side of the plot to the right side of the plot. Trace 302 represents the scheduled engine starting device.

The second plot from the top of FIG. 3 is a plot of transmission gear selector position versus time. The vertical axis represents the transmission gear selector position and the transmission gear selector position may be park (P), reverse (R), neutral (N), or drive (D). The horizontal axis represents time and time increases from the left side of the plot to the right side of the plot. Trace 304 represents the transmission gear selector position.

The third plot from the top of FIG. 3 is a driver demand pedal position versus time. The vertical axis represents the driver demand pedal position and the driver demand pedal position increases in the direction of the vertical axis arrow. The driver demand pedal position increases (e.g., is applied further) in the direction of the vertical axis arrow. The horizontal axis represents time and time increases from the left side of the plot to the right side of the plot. Trace 306 represents the driver demand pedal position.

The fourth plot from the top of FIG. 3 is a plot of a driveline disconnect clutch state versus time. The vertical axis represents the driveline disconnect clutch state and the driveline disconnect clutch is disengaged when trace 308 is at a lower level near the horizontal axis. The driveline disconnect clutch is fully engaged when trace 308 is at a higher level near the vertical axis arrow. The horizontal axis represents time and time increases from the left side of the plot to the right side of the plot. Trace 306 represents the driveline disconnect clutch state.

The fifth plot from the top of FIG. 3 is a plot of a flywheel starter state versus time. The vertical axis represents the flywheel starter state and the flywheel starter is disengaged when trace 310 is at a lower level near the horizontal axis. The flywheel starter is fully engaged and cranking the engine when trace 310 is at a higher level near the vertical axis arrow. The horizontal axis represents time and time increases from the left side of the plot to the right side of the plot. Trace 310 represents the flywheel starter state.

The sixth plot from the top of FIG. 3 is a plot of an engine start request state versus time. The vertical axis represents the engine start request state and the engine start request state asserted (e.g. an engine start is requested) when trace 312 is at a higher level near the vertical axis arrow. The engine start request state is not asserted when trace 312 is at a lower level near the horizontal axis. The horizontal axis represents time and time increases from the left side of the plot to the right side of the plot. Trace 312 represents the engine start request state. The seventh plot from the top of FIG. 3 is a plot of line pressure (e.g., pressure in a line or conduit that supplies a fluid to the driveline disconnect clutch) versus time. The vertical axis represents the line pressure and line pressure increases in the direction of the vertical axis arrow. The horizontal axis represents time and time increases from the left side of the plot to the right side of the plot. Trace 314 represents the line pressure. Horizontal line 350 represents a threshold line pressure.

At time t0, the engine is not started nor is it scheduled to be started. The gear selector is in park and the driver demand pedal is not applied. The driveline disconnect clutch is open and the flywheel starter is not engaged. The engine start request is not asserted and line pressure is low. The electric machine is providing torque to the vehicle's wheels while the vehicle is in creep mode (not shown).

At time t1, an engine start request is issued in response to low battery state of charge (not shown). The driveline disconnect clutch (DIS) is scheduled to start the engine, but the line pressure is low so the driveline disconnect clutch enters a wait state where torque transfer capacity of the driveline disconnect clutch is limited to less than a threshold amount of torque (e.g., less than 20 Newton-meters). The line pressure is commanded to increase and the driver demand pedal is not applied. The gear selector remains in park and the flywheel starter is not engaged.

At time t2, the vehicle driver (not shown) moves the gear selector from park to drive. The driver demand pedal is not applied and the line pressure remains low so that the driveline disconnect clutch is not closed. The flywheel starter is not engaged and the engine start request remains asserted.

At time t3, the driver begins to apply the driver demand pedal so the scheduled disconnect clutch engine start is cancelled and the flywheel starter is scheduled to start the engine. The vehicle transitions out of creep mode. Cancelling the driveline disconnect clutch allows the electric machine (e.g., 240) to supply torque to meet the driver demand without having to use torque from electric machine 240 to start the engine. Consequently, the driveline may be responsive to driver demand. The gear selector remains in drive and the disconnect clutch is open. The flywheel starter is engaged a short time later at time t4. The engine start request remains asserted and the line pressure continues to increase.

At time t4, the flywheel starter is engaged and the engine is cranked. The gear selector remains in drive and the driver demand pedal is applied. The driveline disconnect clutch remains open and the engine start request remains asserted.

At time t5, the engine is started so the flywheel starter is disengaged. The scheduled engine starting device is returned to none and the gear selector position remains drive. The driver demand pedal is applied and the driveline disconnect clutch is open. The engine start request is withdrawn since the engine is started and the line pressure is at a higher level.

At time t6, the driveline disconnect clutch is closed so that the engine is coupled with to the driveline. The gear selector remains in drive and the flywheel starter remains disengaged. The engine start request is not asserted and the line pressure is high. A break in the sequence occurs between time t6 and time t7.

The sequence continues at time t7 where no engine starting device is scheduled to start the engine and where the gear selector position is park. The driver demand pedal is not applied and the driveline disconnect clutch is open. The flywheel starter is not engaged and the engine start request is not asserted. The line pressure is low and the electric machine is providing torque to the vehicle's wheels while the vehicle is in creep mode (not shown).

At time t8, the engine start request is asserted and the driveline disconnect clutch is scheduled to start the engine. The gear shift lever remains in park. The engine start request may be in response to a low state of battery charge or another vehicle operating condition. The driver demand pedal is not applied and the driveline disconnect clutch is open. The flywheel starter is not engaged and the line pressure is low, but it begins increasing.

At time t9, the gear selector position is changed by the vehicle operator (not shown) to drive and the driveline disconnect clutch remains scheduled to start the engine. The driver demand is zero, but line pressure has increased to be above horizontal line 350. The disconnect clutch begins closing and cranking the engine. The flywheel starter is not engaged and the engine start request remains asserted.

At time t10, the driver demand begins to increase and the driveline disconnect clutch remains the scheduled engine starting device. The vehicle transitions out of creep mode. The engine start request remains asserted as the engine is cranked via the driveline disconnect clutch and the electric machine (not shown). The line pressure continues to increase and the gear selector remains in drive. The driveline disconnect clutch is partially closed.

At time t11, the engine is started and the engine start request is withdrawn. The scheduled engine starting device returns to none and the gear selector remains in drive. The driver demand pedal continues to increase and the driveline disconnect clutch is fully closed. The flywheel starter is not engaged.

Thus, the driveline disconnect clutch may be scheduled to start the engine and it may be applied to start the engine when driver demand pedal position is zero or after the line pressure has reached a threshold pressure so that the driveline disconnect clutch may close in a consistent way.

Referring now to FIG. 4, a method for operating an engine of a hybrid vehicle is shown. The method of FIG. 4 may be at least partially implemented as executable instructions stored in controller memory in the system of FIGS. 1 and 2. Further, the method of FIG. 4 may include actions taken in the physical world to transform an operating state of the system of FIGS. 1 and 2. Additionally, the method of FIG. 4 may provide at least portions of the operating sequence shown in FIG. 3.

At 402, method 400 determines vehicle operating conditions. Vehicle operating conditions may include but are not limited to vehicle speed, driver demand torque or power, driver urgency level, and state of battery charge. Method 400 proceeds to 404.

At 404, method 400 judges whether or not an engine start is requested. An engine start may be requested in response to a driver demand torque or power request that is generated via a driver applying the driver demand pedal, battery state of charge being less than a threshold charge amount, an emission system temperature, a level of stored fuel vapor, and other vehicle operating conditions. If method 400 judges that an engine start is requested, the answer is yes and method 400 proceeds to 406. Otherwise, the answer is no and method 400 proceeds to exit. Additionally, in some examples, method 400 may also require that the vehicle be stationary or traveling at a creep speed (e.g., a speed that the vehicle travels after a vehicle is stopped and the vehicle's brake pedal is released without the drive demand pedal being applied after the time when the brake pedal was released) for method 400 to proceed to 406.

At 406, method 400 selects and schedules a device for starting the internal combustion engine. Scheduling the engine starting device may include determining a time at which the engine starting device begins to transfer torque to rotate the engine. In one example, method 400 determines gear selector position and driver demand pedal position to schedule which engine starting device is applied to start the vehicle's internal combustion engine. Method 400 schedules the flywheel starter to start the engine when the gear selector is in a gear engagement position (e.g., reverse, drive, low, etc. where a gear may be engaged) and when driver demand pedal position is greater than zero (e.g., when the driver demand pedal is applied). Method 400 schedules the driveline disconnect clutch to start the engine when the gear selector is in a non-gear engagement position (park or drive) and driver demand pedal position is greater than zero (e.g., applied by a user), or method 400 schedules the driveline disconnect clutch to start the engine when the gear selector is in a gear engagement position and driver demand pedal position is zero (e.g., not applied by a user). Method 400 proceeds to 408 after the engine starting device is scheduled.

At 408, method 400 judges whether or not the driveline disconnect clutch is scheduled to start the internal combustion engine. Scheduling the driveline disconnect clutch to start the engine may include determining a time at which the driveline disconnect clutch is to begin closing. The time that the driveline disconnect clutch begins to close may be a function of driver demand torque, vehicle speed, and other vehicle conditions. If method 400 judges that the driveline disconnect clutch has been selected to start the internal combustion engine, the answer is yes and method 400 proceeds to 410. Otherwise, the answer is no and method 400 proceeds to 432.

At 410, method 400 commands a high line pressure (e.g., a pressure that will cause the driveline disconnect clutch to fully close from a full open position within a predetermined amount of time, such as 1.5 seconds) in a line that supplies fluid to the driveline disconnect clutch. The high line pressure may be provided by increasing efficiency of one or more transmission pumps and/or increasing power supplied to the one or more transmission pumps. Method 400 proceeds to 412.

At 412, method 400 operates the driveline disconnect clutch in a wait state where torque capacity (e.g., the maximum amount of torque that the driveline disconnect clutch may transfer) of the driveline disconnect clutch is constrained or held below a threshold torque capacity. Method 400 may constrain or limit the driveline disconnect clutch torque capacity by constraining pressure of fluid to close the driveline disconnect clutch. In one example, the driveline disconnect clutch torque capacity is constrained to be less than 20 Newton-meters so that input inertia of the transmission may be limited, thereby reducing a possibility of driveline torque disturbances during transmission shifting. Method 400 proceeds to 414 after operation of the driveline disconnect clutch enters the wait state.

At 414, method 400 judges whether or not to switch or change the scheduled engine starting device from the driveline disconnect clutch to the flywheel starter. Method 400 may judge whether or not to switch engine starting devices based on vehicle operating conditions. If method 400 judges to switch the engine starting device to the flywheel starter, the answer is yes and method 400 proceeds to 430. If method 400 judges not to switch the engine starting device, the answer is no and method 400 proceeds to 416. Method 400 may change the scheduled engine starting device so that vehicle drivability may be improved. In one example, method 400 may judge to start the engine via the flywheel starter if the gear selector is in a gear engaging position and if driver demand pedal position is greater than zero (e.g., is being applied). Method 400 may proceed to 416 if line pressure (e.g. pressure in conduit 248) is greater than a threshold pressure and if an amount of time since a most recent engine start request was generated is greater than a threshold amount of time. If method 400 does not judge that the line pressure is greater than the threshold pressure and that an amount of time since a most recent engine start request was generated is greater than the threshold amount of time, or that the gear selector is in the gear engaging position and that driver demand pedal position is greater than zero, then method 400 may stay at 414 until one of the conditions is met.

At 416, method 400 starts the engine via closing the driveline disconnect clutch. The driveline disconnect clutch is closed so that the engine rotates at a desired cranking speed (e.g., 250 RPM). The engine is supplied with spark and fuel while the engine is being rotated. Once the engine starts, the driveline disconnect clutch is fully closed. Method 400 proceeds to exit.

At 430, method 400 switches from the driveline disconnect clutch being the scheduled engine starter to the flywheel starter being the scheduled engine starter. Method 400 proceeds to 432.

At 432, method 400 starts the engine via the flywheel starter. The flywheel starter cranks the engine while spark and fuel are provided to the engine. Method 400 proceeds to 434.

At 434, method 400 fully closes the driveline disconnect clutch so that the engine may begin delivering power to the vehicle's wheels. Method 400 proceeds to exit.

Thus, method 400 may select an engine starting device in response to an engine start request. If the driver demand pedal is not applied, the engine may be started via closing a driveline disconnect clutch. However, if the driver demand pedal is applied, the engine may be started via a flywheel starter. If pressure in a line supplying transmission fluid to a driveline disconnect clutch reaches a threshold pressure before the driver demand pedal is applied, the driveline disconnect clutch may be closed to start the engine. Because the line pressure is high, the torque that is delivered to the engine via the driveline disconnect clutch and an electric machine may be more repeatable.

The method of FIG. 4 provides for a method for operating a vehicle, comprising: via a controller, scheduling an internal combustion engine of the vehicle to be started via closing a driveline disconnect clutch; and via the controller, increasing a line pressure and delaying starting of the internal combustion engine via closing the driveline disconnect clutch while the line pressure is less than a threshold pressure, a driver demand pedal is not applied, and a gear selector is in a gear engagement position. In a first example, the method includes where the gear engagement position is reverse position or a forward gear position. In a second example that may include the first example, the method further comprises closing the driveline disconnect clutch and starting the internal combustion engine in response to the line pressure exceeding the threshold pressure. In a third example that may include one or both of the first and second examples, the method further comprises cancelling starting of the internal combustion engine via the driveline disconnect clutch in response to the driver demand pedal being applied and the gear selector being in the gear position. In a fourth example that may include one or more of the first through third examples, the method further comprises starting the internal combustion engine via a flywheel starter. In a fifth example that may include one or more of the first through fourth examples, the method further comprises starting of the internal combustion engine via the driveline disconnect clutch in response to a threshold amount of time passing since a most recent engine start request. In a sixth example that may include one or more of the first through fifth examples, the method includes where the engine start request is based on a state of battery charge. In a seventh example that may include one or more of the first through sixth examples, the method includes where scheduling the internal combustion engine of the vehicle to be started is based on the gear selector being in park or neutral, or is based upon the gear selector being in the gear position and the driver demand pedal not being applied.

The method of FIG. 4 also provides for a method for operating a vehicle, comprising: via a controller, scheduling which of two starting devices start an internal combustion engine of the vehicle in response to a position of a gear selector and driver demand pedal position; and via the controller, starting the internal combustion engine via a flywheel starter in response to a gear selector being in a gear engagement position and a driver demand pedal being applied, and starting the internal combustion engine via a driveline disconnect clutch in response to the gear selector being in a non-gear engagement position, and starting the internal combustion engine via the driveline disconnect clutch in response to the gear selector being in a gear engagement position and the driver demand pedal not being applied. In a first example, the method further comprises switching from scheduling to start the internal combustion engine to starting the internal combustion engine via the flywheel starter. In a second example that may include the first example, the method includes where the internal combustion engine is started via the flywheel starter in response to applying a driver demand pedal. In a third example, that may include one or both of the first and second examples, the method further comprises placing the driveline disconnect clutch in a wait state in response to scheduling to start the internal combustion engine via the driveline disconnect clutch. In a fourth example that may include one or more of the first through third examples, the method includes where the wait state includes a torque capacity of the driveline disconnect clutch being constrained below a threshold torque capacity.

Note that the example control and estimation routines included herein can be used with various engine and/or vehicle system configurations. Further, the methods described herein may be a combination of actions taken by a controller in the physical world and instructions within the controller. At least portions of the control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating a vehicle, comprising:
via a controller, scheduling an internal combustion engine of the vehicle to be started via closing a driveline disconnect clutch;
via the controller, increasing a line pressure supplied to the driveline disconnect clutch and delaying starting of the internal combustion engine via closing the driveline disconnect clutch while the line pressure is less than a threshold pressure, a driver demand pedal is not applied, and a gear selector is in a gear engagement position; and
via the controller, cancelling starting of the internal combustion engine via the driveline disconnect clutch in response to the driver demand pedal being applied and the gear selector being in the gear engagement position.

2. The method of claim 1, where the gear engagement position is reverse position or a forward gear position.

3. The method of claim 1, further comprising closing the driveline disconnect clutch and starting the internal combustion engine in response to the line pressure exceeding the threshold pressure.

4. The method of claim 1, further comprising starting the internal combustion engine via a flywheel starter.

5. The method of claim 1, further comprising starting the internal combustion engine via the driveline disconnect clutch in response to a threshold amount of time passing since a most recent engine start request.

6. The method of claim 5, where the most recent engine start request is based on a state of battery charge.

7. The method of claim 1, where scheduling the internal combustion engine of the vehicle to be started is based on the gear selector being in park or neutral, or is based upon the gear selector being in the gear engagement position and the driver demand pedal not being applied.

8. A system, comprising:
an internal combustion engine including a flywheel starter coupled to the internal combustion engine;
an integrated starter/generator;
a disconnect clutch positioned in a driveline between the internal combustion engine and the integrated starter/generator;
a transmission included in the driveline; and
a controller including executable instructions stored in non-transitory memory that cause the controller to place operation of the disconnect clutch in a wait state, where a torque capacity of the disconnect clutch is constrained below a threshold value, while a line pressure supplied to the disconnect clutch is less than a threshold pressure and an engine start is requested, and additional instructions to start the internal combustion engine via the flywheel starter in response to driver demand pedal position increasing.

9. The system of claim 8, further comprising additional instructions to start the internal combustion engine via closing the disconnect clutch in response to the line pressure exceeding the threshold pressure.

10. The system of claim 8, further comprising additional instructions to start the internal combustion engine and not place the disconnect clutch in the wait state in response to an engine start request, a driver demand pedal being applied, and a gear selector being in a gear position.

11. The system of claim 10, where the gear position is reverse or drive.

12. The system of claim 8, further comprising additional instructions to start the internal combustion engine via closing the disconnect clutch in response to a threshold amount of time passing since a most recent engine start request.

13. A method for operating a vehicle, comprising:
via a controller, scheduling which of two starting devices start an internal combustion engine of the vehicle in response to a position of a gear selector and driver demand pedal position; and
via the controller, starting the internal combustion engine via a flywheel starter in response to the gear selector being in a gear engagement position and a driver demand pedal being applied, and starting the internal combustion engine via a driveline disconnect clutch in response to the gear selector being in a non-gear engagement position, and starting the internal combustion engine via the driveline disconnect clutch in response to the gear selector being in the gear engagement position and the driver demand pedal not being applied.

14. The method of claim 13, further comprising switching from scheduling to start the internal combustion engine to starting the internal combustion engine via the flywheel starter.

15. The method of claim 14, where the internal combustion engine is started via the flywheel starter in response to applying the driver demand pedal.

16. The method of claim 13, further comprising placing the driveline disconnect clutch in a wait state in response to scheduling to start the internal combustion engine via the driveline disconnect clutch.

17. The method of claim 16, where the wait state includes a torque capacity of the driveline disconnect clutch being constrained below a threshold torque capacity.

\* \* \* \* \*